(12) United States Patent
Hsu et al.

(10) Patent No.: US 7,586,878 B2
(45) Date of Patent: Sep. 8, 2009

(54) VERTICAL HANDOFF METHOD AND SYSTEM IN WLAN/3G INTEGRATED NETWORKS

(75) Inventors: Yu-Ching Hsu, Hsinchu County (TW); Pai-Feng Tsai, Taipei (TW); Chao-Ching Wu, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 481 days.

(21) Appl. No.: 11/308,827

(22) Filed: May 12, 2006

(65) Prior Publication Data

US 2007/0133467 A1    Jun. 14, 2007

Related U.S. Application Data

(60) Provisional application No. 60/741,950, filed on Dec. 1, 2005.

(51) Int. Cl.
*H04W 4/00* (2006.01)
*H04W 36/00* (2006.01)

(52) U.S. Cl. .................. 370/331; 455/436; 455/437; 455/438; 455/439; 455/442

(58) Field of Classification Search .................. 370/331; 455/436, 437, 438, 439, 442
See application file for complete search history.

(56) References Cited

U.S. PATENT DOCUMENTS

| | | | |
|---|---|---|---|
| 6,385,451 B1 | 5/2002 | Kalliokulju et al. | 455/437 |
| 7,346,027 B2 * | 3/2008 | Bossoli et al. | 370/328 |
| 7,363,037 B2 * | 4/2008 | Huang et al. | 455/436 |
| 7,400,886 B2 * | 7/2008 | Sahim et al. | 455/444 |
| 2004/0137901 A1 * | 7/2004 | Hamasaki et al. | 455/436 |
| 2004/0233866 A1 * | 11/2004 | Bossoli et al. | 370/328 |
| 2005/0135311 A1 * | 6/2005 | Maillard | 370/331 |
| 2006/0010272 A1 * | 1/2006 | Solomon et al. | 710/105 |
| 2006/0140149 A1 * | 6/2006 | Kim et al. | 370/331 |
| 2006/0221933 A1 * | 10/2006 | Bauer et al. | 370/352 |
| 2007/0064647 A1 * | 3/2007 | Prasad | 370/331 |
| 2007/0091844 A1 * | 4/2007 | Huang et al. | 370/331 |
| 2008/0025239 A1 * | 1/2008 | Bossoli et al. | 370/312 |

FOREIGN PATENT DOCUMENTS

| | | |
|---|---|---|
| EP | 1 090 519 B1 | 3/2003 |
| EP | 1 523 208 A1 | 4/2005 |

* cited by examiner

*Primary Examiner*—Joseph H Feild
*Assistant Examiner*—Huy D Nguyen
(74) *Attorney, Agent, or Firm*—Jianq Chyun IP Office

(57) ABSTRACT

An IPSec tunnel is established by assigning parameters TS and SPI being translated into TFT (PF I, PF II). A first index is assigned. A GTP tunnel is established based on TFT (PF I, PF II) and the first index. GGSN generates a table based on TFT (PF I, PF II) and the first index, for UE in WLAN network to access 3G services. UE assigns a second index when roaming into the 3G network. A tunnel between SGSN and UE is established based on TFT (PF I, PF II) and the second index. Another tunnel between the SGSN and the GGSN is established based on TFT (PF I, PF II) and the second index. GGSN searches for the table with the first index based on SPI in the TFT (PF II), for reusing the table for not interrupting 3G services provided to the UE in the 3G network.

24 Claims, 3 Drawing Sheets

VERTICAL HANDOFF METHOD AND SYSTEM IN WLAN/3G INTEGRATED NETWORKS

CROSS-REFERENCE TO RELATED APPLICATION

This application claims the priority benefits of U.S. provisional application Ser. No. 60/741,950, filed on Dec. 1, 2005. All disclosure of this application is incorporated herein by reference.

BACKGROUND OF THE INVENTION

1. Field of Invention

The present invention relates to a vertical handoff method and system in WALN/3G integrated networks for reducing handoff latency and data loss during vertical handoff.

2. Description of Related Art

Although 3G (third generation) network can cover almost everywhere and a bunch of services are provided at cheaper price. However, a lower-cost and higher bandwidth WLAN (Wireless Local Area Network) network is a still better alternative. 3G network has a wide coverage range but a low transmission speed. On the contrary, WLAN network has a narrow coverage range but a high transmission speed. WLAN and 3G networks are complementary to each other.

Owing to more convenient and less expensive applications, the 3G network services are getting popular than ever. Besides, the WLAN infrastructures are built ubiquitously. The integration between the WLAN system and the 3G system is unavoidable.

A user equipment (UE) may move or roam between the WLAN network and the 3G network during the UE accesses 3G data services. This is called "vertical handoff". When a vertical handoff occurs, the UE hopes to continue the 3G data services. However, during the UE roams into 3G network, a gateway takes some time in rebuilding connection to the UE. If the rebuilding process takes long time, handoff latency and packet loss may occur and the 3G data services provided to the UE may be interrupted.

In order to minimize packet loss and handoff latency, it needs a practical method and system for reducing handoff latency when UE roams between the WLAN network and the 3G network.

SUMMARY OF THE INVENTION

One of the aspects of the invention is to provide a vertical handoff method and system in WALN/3G integrated networks for reducing handoff latency.

Another aspect of the invention is to provide a vertical handoff method and system in WLAN/3G integrated networks for reusing tables previously established in the 3G core network.

To achieve the above and other aspects, the invention provides a vertical handoff method and system between a WLAN network and a 3G network for reducing handoff latency. A first tunnel (IPSec tunnel) is established between a relay node (TTG) and a user equipment (UE) in the WLAN network by assigning parameters SPI and TS when the user equipment is located in the WLAN network. The relay node translates the parameters TS and SPI into TFT(PF I, PF II) respectively and randomly assigns a first table index (NSAPI). Note that PF I and PF II are in packet filter type I and II, respectively. A second tunnel (GTP tunnel) between the relay node and a support node (GGSN) is established based on the TFT(PF I, PF II) and the first table index. A first table (PDP Context) is established based on the TFT(PF I, PF II) and the first table index by the GGSN, for the user equipment in the WLAN network to access 3G services. The UE randomly assigns a second table index when the user equipment roams from the WLAN network into the 3G network. Because the UE applies the same translation rules as the relay node, a third tunnel between another support node (SGSN) and the UE in the 3G network is established based on the TFT(PF I, PF II) and the second table index. A fourth tunnel between the SGSN and the GGSN is established based on the TFT(PF I, PF II) and the second table index. The GGSN searches for the first table with the first table index based on the parameter SPI in PF II of the TFT. If the search is successful, the GGSN reuses the first table by replacing the first table index by the second table index, for the user equipment in the 3G network to continue the 3G services. If the search for the first table is failed, the GGSN establishes a second table based on the TFT(PF I, PF II) and the second table index, for the user equipment in the 3G network to access 3G services.

To achieve the above and other aspects, the invention provides another vertical handoff method and system between a 3G network and a WLAN network for reducing handoff latency. A first tunnel between a support node (SGSN) and a user equipment (UE) in the 3G network is established by assigning a first table index (NSAPI) and generating a TFT (PF I) by the user equipment when the user equipment is located in the 3G network. A second tunnel between the SGSN and another support node (GGSN) is established based on the TFT(PF I) and the first table index. The GGSN establishes a first table based on the TFT(PF I) and the first table index, for the user equipment in the 3G network to access 3G services via the GGSN. The UE translates the TFT(PF I) into a parameter TS and assigns another parameter SPI when the UE roams from the 3G network into the WLAN network. A third tunnel between a relay node (TTG) and the user equipment in the WLAN network is established based on the parameters TS and SPI. The TTG translates the parameters TS and SPI into TFT(PF I, PF II) and randomly assigns a second table index. A fourth tunnel between the TTG and the GGSN is established based on the TFT(PF I, PF II) and the second table index. The GGSN searches for the first table with the first table index based on the TFT(PFI). If the search is successful, the GGSN reuses the first table by replacing the first table index by the second table index and updating the TFT(PF I) with the TFT(PF I, PF II), for the user equipment in the WLAN network to continue the same 3G services via the GGSN. If the search for the first table is failed, the GGSN establishes a second table based on the TFT(PFI, PF II) and the second table index, for the user equipment in the WLAN network to access 3G data services via the GGSN.

It is to be understood that both the foregoing general description and the following detailed description are exemplary, and are intended to provide further explanation of the application.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
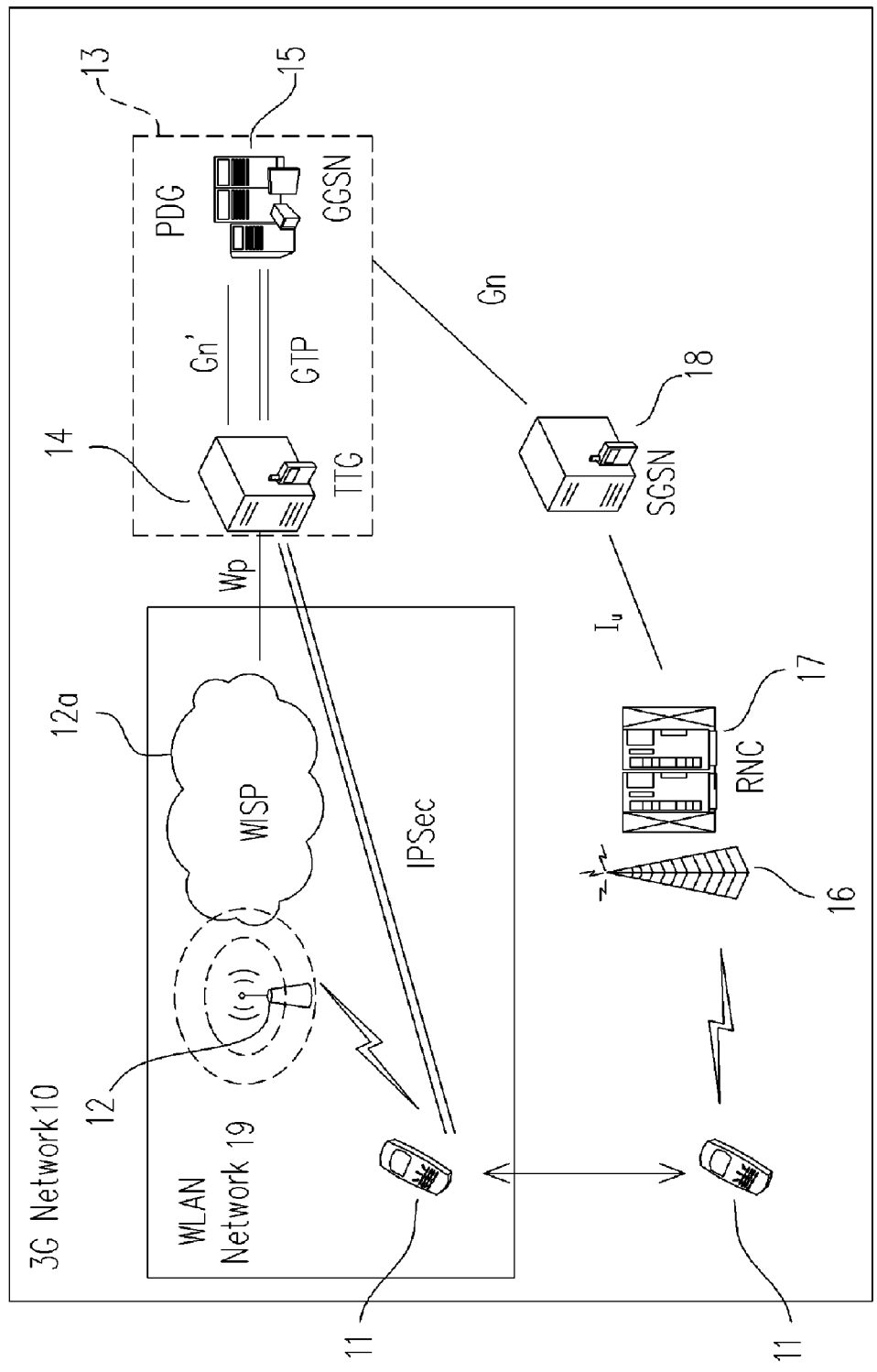
FIG. 1 is the architecture of a WLAN/3G integrated network.

FIG. 1 is the architecture of a WLAN/3G integrated network. A UE (User Equipment) 11 is operated in dual modes. The UE 11 is for example, but not limited by, a cellular phone, a PDA (personal digital assistant) or a notebook computer (NB). It is assumed that the dual mode UE 11 can attach to the WLAN network 19 or the 3G network 10 automatically. Please note that, in FIG. 1, the coverage range of the WLAN network 19 is overlapped and inside the 3G network 10. A WLAN access point 12 transmits and receives WLAN signals into and from the UE 11. WISP (Wireless Internet Service Provider) 12a provides wireless Internet service to the UE 11.

In this integrated network, when the UE 11 located in the WLAN network 19 wants to use 3G services or applications provided by the 3G network 10, the UE 11 should establish connection across the two systems 10 and 19. In the WLAN network 19, IPSec tunnels are established between the UE 11 and a TTG (Tunnel Terminal Gateway) 14 first and then GTP (GPRS Tunneling Protocol) tunnels are established between the TTG 14 and a GGSN (Gateway GPRS Support Node) 15. The TTG 14 is a relay node or an intermediate node for taking care of the IPSec tunnels and the GTP tunnels. The TTG 14 transfers the IPSec tunnels into GTP tunnels. The TTG 14 establishes the one-to-one mapping GTP tunnels toward the GGSN 15 via two GTP protocol messages, "Create PDP (Packet Data Protocol) Context Request" and "Create PDP Context Response". After the IPSec tunnels and GTP tunnels are established, the GGSN 15 generates a table (or called PDP context) for the UE 11 in the WLAN network 19.

The PDG (Packet Data Gateway) 13 is defined to be the entry point for user in WLAN to access 3G services/applications. It is also suggested that GGSN 15 could be reused to implement the PDG 13. The PDG 13 includes the TTG 14 and the GGSN 15. The 3G network 10 has feasibility on WLAN inter-working and the PDG 13 is proposed to deal with the inter-working. After the IPSec tunnels and the GTP tunnels are both established and other necessary procedures are completed, the UE 11 may begin to access 3G data services via the PDG 13.

When the UE 11 is located in or roams into the 3G network 10, the UE 11 establishes connection toward the GGSN 15 via a 3G base station 16, an RNC (Radio Network Controller) 17, and an SGSN (Service GPRS support node) 18. In FIG. 1, the WLAN access point 12 is located in the WLAN network 19. The PDG 13, the TTG 14, the GGSN 15, the 3G base station 16, the RNC 17 and the SGSN 18 are all located in the 3G network. Wp, Gn', Gn and Iu are interfaces.

Sometimes, the UE 11, currently using the 3G data services, may roam from the WLAN network 19 into the 3G network 10. In other words, a vertical handoff occurs. If handoff latency is long or data loss is serious, the 3G data services provided to the UE 11 may be interrupted. As known, in rebuilding the connection between the UE 11 in 3G network 10 to the GGSN 15, if it needs to generate a new table (or said PDP context) for the UE in 3G network 10, the data packets queued in the previous table might be lost, causing long retransmission time. In other words, reusing the previous table could prevent the data packet queued in the previous table from being lost and therefore the handoff latency is reduced.

The previous table is established when the UE 11 in the WLAN network 19 and the new table is established when the UE 11 roams from the WLAN network 19 to the 3G network 10. The previous table has the same structure as the new table, but maybe different content.

Figure 2:
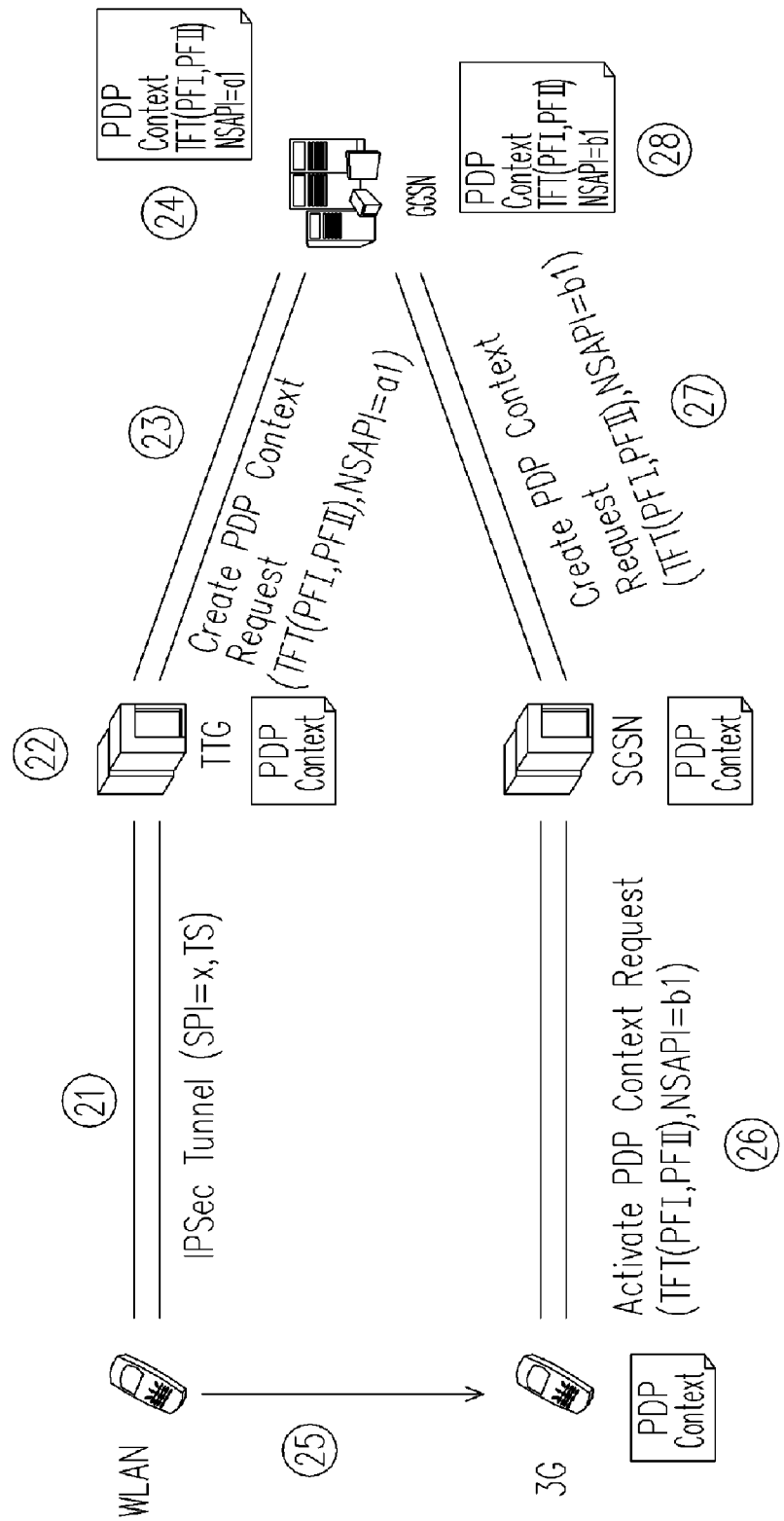
FIG. 2 shows the vertical handoff from a WLAN network to a 3G network according to the first embodiment of the invention.

FIG. 2 shows the vertical handoff from the WLAN network to the 3G network according to a first embodiment of the invention. When the UE wants to access 3G data services, UE has to establish connections to the GGSN (or the PDG). As shown in FIG. 2, to establish the connections, the UE first establish IPSec tunnels toward the TTG by assigning parameters SPI (security private index)=x and TS (traffic selection), as shown in Step 21. The parameter TS includes for example, a TS type field, an IP protocol ID (identification) field, a selector length field, a start port field, an end port field, a staring address field and an ending address field.

For establishing the GTP tunnels to the GGSN, the TTG has to generate or translate the parameters SPI and TS into TFT (traffic flow template) parameters. The TFT parameter may include more than one packet filters. The TTG should translate the parameter TS in the IPSec tunnel into a packet filter type I (PF I) or TFT(PF I). The translation is straightforward. However, it would not be a lossless translation. The packet filter in type I (PF I) or TFT(PF I) for example includes a source address and subnet mask field, a protocol number (or next header) field, a destination port range field, a source port range field, and a TOS (Type of Service) (or Traffic Class) and mask field. A second packet filter in type II (PF II) or TFT(PF II) should be added in the TFT to carry the parameter SPI of the associated IPSec tunnel to the GGSN. The second packet filter in type II for example includes a source address and subnet mask field, a protocol number (or next header) field, an IPSec SPI field, and a TOS (or Traffic Class) and mask field. The TTG randomly assigns another parameter NSAPI (Network Service Access Point Identifier) as a1, as shown in Step 22. If the UE does not roam to the 3G network, the random assignment of NSAPI by the TTG does not cause any problem. However, when vertical handoff occurs, the UE in the 3G network might assign a different NSAPI for the same data connection. Thus, in GGSN, two tables (two PDP Contexts) will be created for the same connection. Therefore, the PDP Context to be reused should change the old value of NSAPI assigned by TTG to the new value assigned by the UE.

The TTG establishes the GTP tunnels toward the GGSN by carrying the TFT(PF I, PF II) and the parameter NSAPI(a1) in the "Create PDP Context Request", as shown in Step 23. In Step 23, TFT(PF I, PF II) refers to the packet filters in type I and type II. In Step 24, the GGSN builds a table (or PDP Context) with TFT(PF I, PF II) and NSAPI=a1. The accomplishment of the table means the UE already establishes connection toward the GGSN and the UE may begin to access 3G data services. When GGSN has downlink data for the UE, the GGSN dispatches the data to a specified GTP tunnel via the TFT packet filters. Then the TTG relays data to the corresponding IPSec tunnel toward the UE.

When the UE is leaving the WLAN network for the 3G network, the UE attaches to the 3G network automatically in Step 25. After the UE roams into the 3G network, the UE generates the TFT(PF I, PF II) by itself because the UE applies the same translation rule as the TTG. The UE sends an "Activate PDP Context Request" message in step 26 with the TFT(PF I, PF II) and another new assigned parameter NSAPI (b1), as shown in Step 26. The new parameter NSAPI (b1) is assigned by the UE when the UE is located in the 3G network.

To establish connection toward the GGSN, the SGSN forwards the "Create PDP Context Request" message with the TFT(PF I, PF II) and the new parameter NSAPI(=b1) to GGSN, as shown in Step 27. Then, the GGSN uses the phone number of the UE (or IMSI (International Mobile Subscriber Identity) or PDP address or the like) and the parameter SPI=x as the searching indexes for finding the table already established during the UE is located in the WLAN network. If the previously established table is found, the NSAPI field in the table is changed from the old value "a1" to the new value "b1" (in step 28). That is, for reusing the PDP Context created previously, the value of NSAPI field in the table should be modified. On the contrary, if no PDP Context is found, a new table will be created with the parameter NSAPI=b1.

According to the first embodiment of the invention, the handoff latency is short or the data loss is not serious if the UE continues to access the same 3G data services when the UE roams from the WLAN network to the 3G network.

Figure 3:
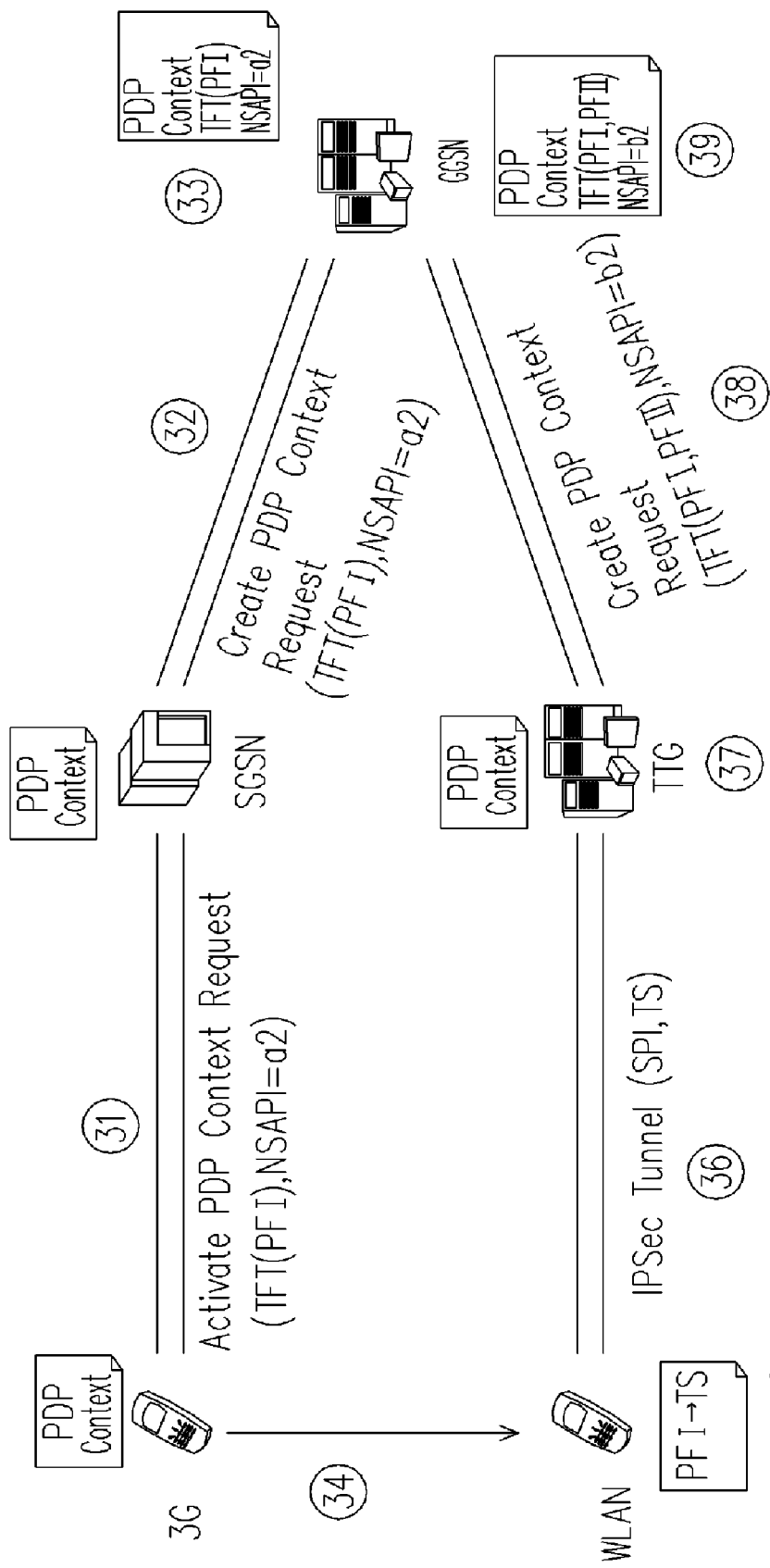
FIG. 3 shows the vertical handoff from a 3G network to a WLAN network according to the second embodiment of the invention.

FIG. 3 shows the vertical handoff from the 3G network to the WLAN network according to a second embodiment of the invention. In FIG. 3, the UE accesses 3G data services when UE is located in the 3G network. Then the UE roams from the 3G network into the WLAN network and the UE still wants to continue the same 3G data services.

If the UE wants to access 3G data services when the UE is located in the 3G network, the UE needs to establish connections toward the GGSN. The UE assigns a new parameter NSAPI (a2) and generates the TFT (PF I) by itself. The UE sends an "Activate PDP Context Request" message with the newly assigned parameter NSAPI (a2) and the TFT (PF I) towards to the SGSN, as shown in Step 31. The SGSN forwards a "Create PDP Context Request" message towards to the GGSN, as shown in Step 32. This "Create PDP Context Request" message includes the TFT (PF I) and the parameter NSAPI (a2). Hence it might be that only one packet filter PFI is built for the TFT in the "Create PDP Context Request" message. Then, the GGSN creates a table for the UE with the TFT (PF I) and the parameter NSAPI (a2), as shown in Step 33. If the table is completed, the UE may begin to access 3G data services via the GGSN.

When the cheaper WLAN network is available for the UE, the UE may roam to the WLAN network, as shown in Step 34. After the roaming, if the UE wants to continue the same 3G data services, it has to establish connection toward the GGSN via the TTG. The UE has to establish a corresponding IPSec tunnel towards to the TTG in Step 36. Therefore, UE assigns a parameter SPI and translates the TFT (PF I) into another parameter TS in Step 35. This translation is lossless. The TTG translates the parameter TS to the original TFT (PF I) again, translates the parameter SPI into the TFT (PF II) and assigns a new value (b2) of the NSAPI parameter to build the GTP tunnel toward the GGSN in Step 37. The TTG sends a "Create PDP Context Request" message with the TFT (PF I, PF II) and the NSAPI (b2) parameter to the GGSN in Step 38. The GGSN uses the TFT (PF I) and the phone number (or IMSI (International Mobile Subscriber Identity) or PDP address or the like) of the UE to search the existing table for reusing. If a previously established table match the criteria, the NSAPI field in the table with NSAPI=a2 is replaced by NSAPI=b2 and the packet filter TFT(PFI) is updated by TFT(PFI, PFII), as shown in Step 39. If no previously established table match the criteria, a new table with NSAPI=b2 is established. This replacement would not cause any problem because the UE in the WLAN network is not aware of NSAPI.

According to the second embodiment of the invention, the handoff latency is short and the data loss is not serious if the UE continues the same 3G data services when the UE roams from the 3G network to the WLAN network.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A vertical handoff method between a first communication network and a second communication network for reducing handoff latency, the method comprising:
   establishing a first tunnel by assigning a first parameter and a second parameter when a user equipment is located in the second communication network;
   translating the first parameter and the second parameter into a first packet filter and a second packet filter;
   establishing a second tunnel and a first table based on the first packet filter and the second packet filter for the user equipment to access services from the first communication network;
   generating the first packet filter and the second packet filter by the user equipment when the user equipment roams into the first communication network;
   establishing a third tunnel and a fourth tunnel based on the first packet filter and the second packet filter; and
   searching for the first table based on the second parameter in the second packet filter for reusing the first table, for the user equipment to continue to access the services from the first communication network.

2. The method of claim 1, further comprising:
   if the search for the first table is failed, establishing a second table based on the first packet filter and the second packet filter, for the user equipment in the first communication network to access the services from the first communication network.

3. The method of claim 1, wherein the first communication network is a 3G network and the second communication network is a WLAN network.

4. The method of claim 1, wherein the user equipment is a cellular phone, a PDA (personal digital assistant) or a notebook computer (NB).

5. The method of claim 1, wherein the step of translating the first parameter and the second parameter includes a step of assigning a first table index.

6. The method of claim 5, wherein when the user equipment roams into the first communication network, the user equipment further assigns a second table index.

7. The method of claim 6, wherein the step of reusing the first table includes a step of replacing the first table index by the second table index for reusing the first table.

8. A vertical handoff method between a first communication network and a second communication network for reducing handoff latency, the method comprising:
   establishing a first tunnel and a second tunnel generating a first packet filter when a user equipment is located in the first communication network;
   establishing a first table based on the first packet filter, for the user equipment to access services from the first communication network;
   translating the first packet filter into a first parameter and assigning a second parameter when the user equipment roams into the second communication network;
   establishing a third tunnel based on the first parameter and the second parameter;

translating the first parameter into the first packet filter and translating the second parameter into a second packet filter;

establishing a fourth tunnel based on the first packet filter and the second packet filter;

searching for the first table based on the first packet filter for reusing the first table, for the user equipment to continue to access the services from the first communication network.

9. The method of claim 8, further comprising:

if the search for the first table is failed, establishing a second table based on the first packet filter and the second packet filter, for the user equipment to access services from the first communication network.

10. The method of claim 8, wherein the first communication network is a 3G network and the second communication network is a WLAN network.

11. The method of claim 8, wherein the user equipment is a cellular phone, a PDA (personal digital assistant) or a notebook computer (NB).

12. The method of claim 8, wherein the step of establishing the first tunnel includes a step of assigning a first table index.

13. The method of claim 12, wherein the translating step includes a step of assigning a second table index.

14. The method of claim 13, wherein the step of reusing the first table includes a step of replacing the first table index by the second table index and updating the first packet filter with the first packet filter and the second packet filter.

15. A vertical handoff system between a first communication network and a second communication network for reducing handoff latency, the system comprising:

a user equipment, a relay node, a first support node, and a second support node, wherein, a first tunnel is established by assigning a first parameter and a second parameter when the user equipment is located in the second communication network; the first parameter and the second parameter are translating into a first packet filter and a second packet filter by the relay node; a second tunnel is established based on the first packet filter and the second packet filter; a first table is established based on the first filter and the second packet filter by the first support node, for the user equipment to access services from the first communication network; the user equipment generates the first packet filter and the second packet filter when the user equipment roams into the first communication network; a third tunnel and a fourth tunnel are established based on the first packet filter and the second packet filter; the first support node searches the first table based on the second parameter in the second packet filter for reusing the first table-for the user equipment to continue to access the services from the first communication network.

16. The system of claim 15, wherein if the search for the first table is failed, the first support node establishes a second table based on the first packet filter and the second packet filter, for the user equipment to access services from the first communication network.

17. The system of claim 15, wherein the first communication network is a 3G network and the second communication network is a WLAN network.

18. The system of claim 15, wherein the user equipment is a cellular phone, a PDA (personal digital assistant) or a notebook computer (NB).

19. The system of claim 15, wherein the relay node further assigns a first table index; the user equipment further assigns a second table index when the user equipment roams into the first communication network; and the first table is reused by replacing the first table index by the second table index in the first support node.

20. A vertical handoff system between a first communication network and a second communication network for reducing handoff latency, the system comprising:

a user equipment, a relay node, a first support node, and a second support node, wherein, a first tunnel and a second tunnel are established via generating a first packet filter by the user equipment when the user equipment is located in the first communication network; the first support node establishes a first table based on the first packet filter, for the user equipment to access services from the first communication network; the user equipment translates the first packet filter into a first parameter and assigns a second parameter when the user equipment roams into the second communication network; a third tunnel is established based on the first parameter and the second parameter; the relay node translates the first parameter into the first packet filter and translates the second parameter into a second packet filter; a fourth tunnel is established based on the first packet filter and the second packet filter; the first support node searches for the first table based on the first packet filter for reusing the first table, for the user equipment to continue to access services from the first communication network.

21. The system of claim 20, wherein if the search for the first table is failed, the first support node establishes a second table based on the first packet filter and the second packet filter, for the user equipment to access services from the first communication network.

22. The system of claim 20, wherein the first communication network is a 3G network and the second communication network is a WLAN network.

23. The system of claim 20, wherein the user equipment is a cellular phone, a PDA (personal digital assistant) or a notebook computer (NB).

24. The system of claim 20, wherein the user equipment assigns a first table index; the relay node assigns a second table index; and if the search is successful, the first table is reused by replacing the first table index by the second table index in the first support node and updating the first packet filter with the first packet filter and the second packet filter.

* * * * *